United States Patent
Oba et al.

(10) Patent No.: US 12,244,032 B2
(45) Date of Patent: Mar. 4, 2025

(54) NON-RECTANGULAR METAL BATTERIES

(71) Applicant: Apple Inc., Cupertino, CA (US)

(72) Inventors: Hirotsugu Oba, Sunnyvale, CA (US); Brian K. Shiu, Sunnyvale, CA (US); Michael P. Zhang, Fremont, CA (US); Xiao Liu, San Jose, CA (US); Christopher R. Pasma, Redwood City, CA (US); Steven M. Labovitz, Sunnyvale, CA (US); Katharine R. Chemelewski, Campbell, CA (US); Erik D. Gillow, Redwood City, CA (US); Joshua Walter, Cupertino, CA (US); Junhua Liu, Hayward, CA (US); Michael H. Tsai, San Jose, CA (US); Stephan P. Abdo, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 178 days.

(21) Appl. No.: 17/481,025

(22) Filed: Sep. 21, 2021

(65) Prior Publication Data

US 2023/0092789 A1    Mar. 23, 2023

(51) Int. Cl.
*H01M 50/284* (2021.01)
*H01M 50/107* (2021.01)
*H01M 50/531* (2021.01)

(52) U.S. Cl.
CPC ....... *H01M 50/284* (2021.01); *H01M 50/107* (2021.01); *H01M 50/531* (2021.01)

(58) Field of Classification Search
CPC ..... H01M 50/102–107; H01M 50/284; H01M 50/531; H01M 10/0436; H01M 10/0585;
(Continued)

(56) References Cited

U.S. PATENT DOCUMENTS

2001/0005561 A1* 6/2001 Yamada ............ H01M 50/105
429/127
2009/0095808 A1* 4/2009 Naccache ........... H01M 50/271
29/729

(Continued)

FOREIGN PATENT DOCUMENTS

KR    20170091938 A  *  8/2017

OTHER PUBLICATIONS

Machine Translation of KR 20170091938 A.*

*Primary Examiner* — Allison Bourke
*Assistant Examiner* — Bethany C Garcia
(74) *Attorney, Agent, or Firm* — Kilpatrick Townsend & Stockton LLP (57) ABSTRACT

Battery systems according to embodiments of the present technology may include a battery including a first electrode terminal and a second electrode terminal accessible along a first surface of the battery. The battery may define a recessed portion of the battery along the first surface of the battery between the first electrode terminal and the second electrode terminal. The battery systems may include a module electrically coupled with the battery. The module may include a circuit board. The module may include a first conductive tab extending from a second surface of the circuit board opposite the first surface of the circuit board. The first conductive tab may be electrically coupling the module with the first electrode terminal. The module may include a second conductive tab extending from the second surface of the circuit board. The second conductive tab may be electrically coupling the module with the second electrode terminal.

20 Claims, 3 Drawing Sheets

(58) Field of Classification Search
CPC .. H01M 10/647; H01M 50/55; H01M 50/543; H01M 50/547; H01M 50/552; H01M 50/553; H01M 6/12; H01M 10/0413; H01M 10/0431; H01M 10/049; H01M 10/058; H01M 10/425; H01M 50/172; H01M 50/202; H01M 50/271; H01M 10/0643; H01M 50/50; H01M 50/31; Y02E 60/10; Y02P 70/50; Y10T 29/5313; Y10T 29/49002; Y02T 10/70
See application file for complete search history.

(56) References Cited

U.S. PATENT DOCUMENTS

| | | | |
|---|---|---|---|
| 2010/0075205 A1* | 3/2010 | Kwag | H01M 50/574 |
| | | | 429/61 |
| 2011/0081573 A1* | 4/2011 | Kim | H01M 50/138 |
| | | | 429/186 |
| 2014/0113184 A1* | 4/2014 | Hamel | H01M 10/0436 |
| | | | 429/163 |
| 2015/0024262 A1* | 1/2015 | Hwang | H01M 50/147 |
| | | | 429/181 |
| 2015/0372353 A1* | 12/2015 | Ryu | H01M 10/0436 |
| | | | 429/61 |
| 2016/0205793 A1* | 7/2016 | Su | H05K 5/0086 |
| | | | 361/752 |

* cited by examiner

NON-RECTANGULAR METAL BATTERIES

TECHNICAL FIELD

The present technology relates to battery systems. More specifically, the present technology relates to battery component configurations incorporating a module with a battery.

BACKGROUND

Batteries are used in many devices. As devices in which batteries are housed reduce in size, the available space for battery cells and associated system materials may limit placement options.

SUMMARY

Battery systems according to embodiments of the present technology may include a battery. The battery may include a first electrode terminal and a second electrode terminal accessible along a first surface of the battery. The battery may define a recessed portion of the battery along the first surface of the battery between the first electrode terminal and the second electrode terminal. The battery systems may include a module electrically coupled with the battery. The module may include a circuit board including one or more electrical components extending from a first surface of the circuit board towards the battery. The module may include a first conductive tab extending from a second surface of the circuit board opposite the first surface of the circuit board. The first conductive tab may be electrically coupling the module with the first electrode terminal. The module may include a second conductive tab extending from the second surface of the circuit board. The second conductive tab may be electrically coupling the module with the second electrode terminal.

In some embodiments, the recessed portion may extend from a position between the first electrode terminal and the second electrode terminal to an edge of the battery. The second electrode terminal may be disposed along the recessed portion of the battery. The module may be disposed within the recessed portion of the battery. The battery may include a battery cell. The battery may include a housing defining the recessed portion. The battery cell may be disposed within the housing. A portion of the battery cell may extend past a plane through the housing along the recessed portion of the first surface of the battery. The first conductive tab may extend beyond a first lateral edge of the module. The second conductive tab may extend beyond a second lateral edge of the module opposite the first lateral edge of the module. The second conductive tab may extend about the second lateral edge of the module and wrap across the first surface of the circuit board towards the second electrode terminal.

The first electrode terminal may extend proud of the first surface of the battery towards the first surface of the circuit board. The first conductive tab may extend outward from the second surface of the circuit board to couple with the first electrode terminal. The circuit board may extend substantially parallel to the first surface of the battery to a location proximate a recess along the first surface of the battery. The battery system may include a structural support coupled about a corner of the battery. The battery system may include insulation disposed within the battery along an interior side of the first surface of the battery. The insulation may be disposed about the first electrode terminal. The insulation may not extend into the recessed portion of the battery along the interior side of the first surface of the battery.

Some embodiments of the present technology may encompass battery systems. The battery systems may include a battery including a housing and a battery cell disposed within the housing. The battery may include a first electrode terminal and a second electrode terminal accessible along a first surface of the housing. The battery may define a recessed portion of the battery along the first surface of the battery between the first electrode terminal and the second electrode terminal. The recessed portion of the battery may extend from a position between the first electrode terminal and the second electrode terminal to an edge of the battery. The systems may include a module electrically coupled with the battery. The module may include a circuit board. The module may include a first conductive tab extending from a second surface of the circuit board opposite a first surface of the circuit board facing the battery. The first conductive tab may be electrically coupling the module with the first electrode terminal. The module may include a second conductive tab extending from the second surface of the circuit board. The second conductive tab may be electrically coupling the module with the second electrode terminal.

In some embodiments, the second electrode terminal may be disposed along the recessed portion of the battery. The module may be disposed within the recessed portion of the battery. The housing of the battery may define at least two rounded corners. A first rounded corner of the at least two rounded corners may be characterized by a first corner radius. A second rounded corner of the at least two rounded corners may be characterized by a second corner radius greater than the first corner radius. The systems may include a structural support coupled along each rounded corner of the at least two rounded corners. The first conductive tab may extend beyond a first lateral edge of the module. The second conductive tab may extend beyond a second lateral edge of the module opposite the first lateral edge of the module.

Some embodiments of the present technology may encompass battery systems. The battery systems may include a battery. The battery may include a first electrode terminal and a second electrode terminal accessible along a first surface of the battery. The battery may define a recessed portion of the battery along the first surface of the battery extending from a position between the first electrode terminal and the second electrode terminal to an edge of the battery. The systems may include a module electrically coupled with the battery. The module may be disposed within the recessed portion of the battery. The module may include a circuit board. The module may include a first conductive tab extending from a second surface of the circuit board opposite a first surface of the circuit board facing the battery. The first conductive tab may be electrically coupling the module with the first electrode terminal. The module may include a second conductive tab extending from the second surface of the circuit board. the second conductive tab may be electrically coupling the module with the second electrode terminal.

Such technology may provide numerous benefits over conventional technology. For example, the present systems may provide a compact positioning of battery system components with a battery. Additionally, the battery system components may be positioned to accommodate a range of volumes and geometries of batteries. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Several of the figures are included as schematics. It is to be understood that the figures are for illustrative purposes, and are not to be considered of scale or proportion unless specifically stated to be of scale or proportion. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, are used in a host of different systems. In many devices, the battery cells may be designed with a balance of characteristics in mind. For example, including larger batteries may provide increased usage between charges, however, the larger batteries may require larger housing, or increased space within the device. As device designs and configurations change, especially in efforts to reduce device sizes, the available space for additional battery system components may be constrained. These constraints may include restrictions in available volume as well as the geometry of such a volume. Conventional devices have often been restricted to larger form factors to accommodate both a sufficient battery as well as associated battery system components. The present technology may overcome these issues, however, by providing a configuration by which battery control system components may be confined to a volume accommodating the battery or a battery system in one or more ways. After illustrating an exemplary cell that may be used in embodiments of the present technology, the present disclosure will describe battery system designs having a controlled form factor for use in a variety of devices in which battery cells may be used.

Although the remaining portions of the description will reference lithium-ion batteries, it will be readily understood by the skilled artisan that the technology is not so limited. The present techniques may be employed with any number of battery or energy storage devices, including other rechargeable and primary battery types, as well as secondary batteries, or electrochemical capacitors. Moreover, the present technology may be applicable to batteries and energy storage devices used in any number of technologies that may include, without limitation, phones and mobile devices, watches, glasses, bracelets, anklets, and other wearable technology including fitness devices, handheld electronic devices, laptops and other computers, as well as other devices that may benefit from the use of the variously described battery technology.

Figure 1:
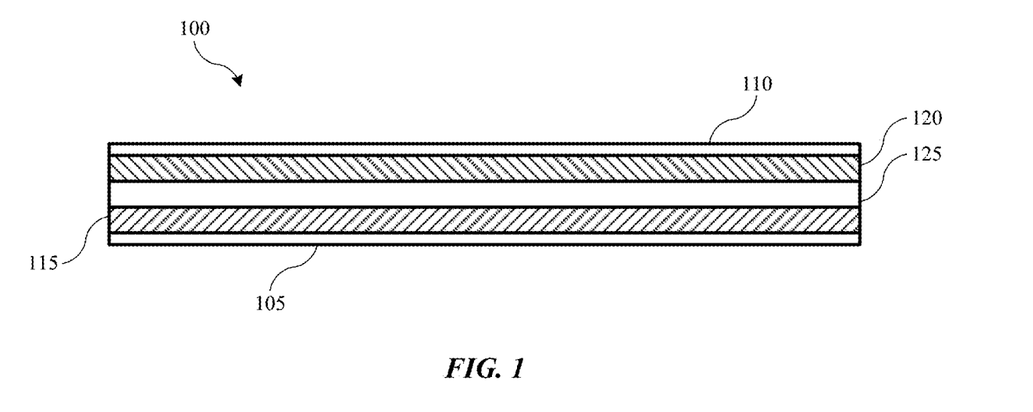
FIG. 1 shows a schematic cross-sectional view of a battery cell according to some embodiments of the present technology.

FIG. 1 depicts a schematic cross-sectional view of an energy storage device or battery cell 100 according to embodiments of the present technology. Battery cell 100 may be or include a battery cell, and may be one of a number of cells coupled together to form a battery structure. As would be readily understood, the layers are not shown at any particular scale, and are intended merely to show the possible layers of cell material of one or more cells that may be incorporated into an energy storage device. In some embodiments, as shown in FIG. 1, battery cell 100 includes a first current collector 105 and a second current collector 110. In embodiments one or both of the current collectors may include a metal or a non-metal material, such as a polymer or composite that may include a conductive material. The first current collector 105 and second current collector 110 may be different materials in embodiments. For example, in some embodiments the first current collector 105 may be a material selected based on the potential of an anode active material 115, and may be or include copper, stainless steel, or any other suitable metal, as well as a non-metal material including a polymer. The second current collector 110 may be a material selected based on the potential of a cathode active material 120, and may be or include aluminum, stainless steel, or other suitable metals, as well as a non-metal material including a polymer. In other words, the materials for the first and second current collectors can be selected based on electrochemical compatibility with the anode and cathode active materials used, and may be any material known to be compatible.

In some instances the metals or non-metals used in the first and second current collectors may be the same or different. The materials selected for the anode and cathode active materials may be any suitable battery materials operable in rechargeable as well as primary battery designs. For example, the anode active material 115 may be silicon, graphite, carbon, a tin alloy, lithium metal, a lithium-containing material, such as lithium titanium oxide (LTO), or other suitable materials that can form an anode in a battery cell. Additionally, for example, the cathode active material 120 may be a lithium-containing material. In some embodiments, the lithium-containing material may be a lithium metal oxide, such as lithium cobalt oxide, lithium manganese oxide, lithium nickel manganese cobalt oxide, lithium nickel cobalt aluminum oxide, or lithium titanate, while in other embodiments the lithium-containing material can be a lithium iron phosphate, or other suitable materials that can form a cathode in a battery cell.

The first and second current collectors as well as the active materials may have any suitable thickness. A separator 125 may be disposed between the electrodes, and may be a polymer film or a material that may allow lithium ions to pass through the structure while not otherwise conducting electricity. Active materials 115 and 120 may additionally include an amount of electrolyte in a completed cell configuration. The electrolyte may be a liquid including one or more salt compounds that have been dissolved in one or more solvents. The salt compounds may include lithium-containing salt compounds in embodiments, and may include one or more lithium salts including, for example, lithium compounds incorporating one or more halogen elements such as fluorine or chlorine, as well as other non-metal elements such as phosphorus, and semimetal elements including boron, for example.

In some embodiments, the salts may include any lithium-containing material that may be soluble in organic solvents. The solvents included with the lithium-containing salt may be organic solvents, and may include one or more carbonates. For example, the solvents may include one or more carbonates including propylene carbonate, ethylene carbonate, ethyl methyl carbonate, dimethyl carbonate, diethyl carbonate, and fluoroethylene carbonate. Combinations of solvents may be included, and may include for example, propylene carbonate and ethyl methyl carbonate as an exemplary combination. Any other solvent may be included that may enable dissolving the lithium-containing salt or salts as well as other electrolyte component, for example, or may provide useful ionic conductivities.

Although illustrated as single layers of electrode material, battery cell 100 may be any number of layers. Although the cell may be composed of one layer each of anode and cathode material as sheets, the layers may also be formed into a jelly roll design, or folded design, prismatic design, or any form such that any number of layers may be included in battery cell 100. For embodiments which include multiple layers, tab portions of each anode current collector may be coupled together, as may be tab portions of each cathode current collector. Once the cell has been formed, a pouch, housing, or enclosure may be formed about the cell to contain electrolyte and other materials within the cell structure, as will be described below. Terminals may extend from the enclosure to allow electrical coupling of the cell for use in devices, including an anode and cathode terminal. The coupling may be directly connected with a load that may utilize the power, and in some embodiments the battery cell may be coupled with a control module that may monitor and control charging and discharging of the battery cell. FIG. 1 is included as an exemplary cell that may be incorporated in battery systems according to the present technology. It is to be understood, however, that any number of battery and battery cell designs and materials that may include charging and discharging capabilities similarly may be encompassed by the present technology.

Figure 2:
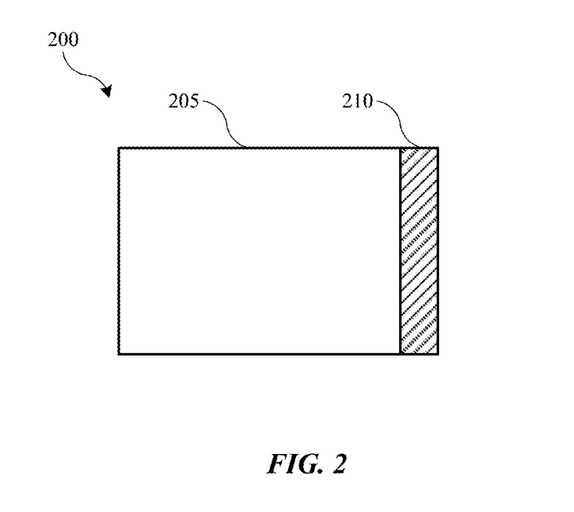
FIG. 2 shows a schematic plan view of a battery system according to some embodiments of the present technology.

FIG. 2 shows a schematic view of a battery system 200 according to some embodiments of the present technology. As illustrated, battery system 200 may include a battery cell or battery 205, which may include any number of battery cells, as well as a battery module 210. Battery module 210 may be electrically connected with battery 205 to provide a variety of functionality. For example, battery module 210 may monitor battery 205 during charging and discharging operations, and may ensure the battery is not overcharged or over-depleted during use. Additionally, battery module 210 may monitor overall health of the battery 205 to ensure proper functioning. Battery module 210 may couple with terminals of the battery, such as one or both of the positive and negative terminals, in order to provide this functionality.

Battery module 210 may also include an additional electrical connector, such as a coupling, that may allow device components to access the battery capacity through the battery module 210. In this way, battery module 210 may provide a pass-through functionality for delivering power from battery 205. Consequently, battery module 210 may be under constant load from the battery. Battery 205 may include a battery cell, which may be similar to battery cell 100 described above, and may include a pouch or enclosure to protect the battery cell from exposure to the environment. The housing may also operate to maintain electrolyte and other materials within the battery cell. To access the battery cell through this housing, one or more terminals or leads may extend through the housing. Some conventional designs may wrap the battery module 210 onto the terminals of battery 205, which may allow the provision of additional materials to protect terminals and conductive components from fluid contact. However, as device configurations continue to shrink, battery designs change, and manufacturing processes incorporate many more small scale operations with smaller and/or thinner materials, these types of incorporations may become less feasible or prone to causing damage. The present technology allows for an adjacent coupling of the battery module 210 onto terminals of the battery 205, which may further reduce the overall battery system envelope when incorporated within an electronic device.

Figure 3A:
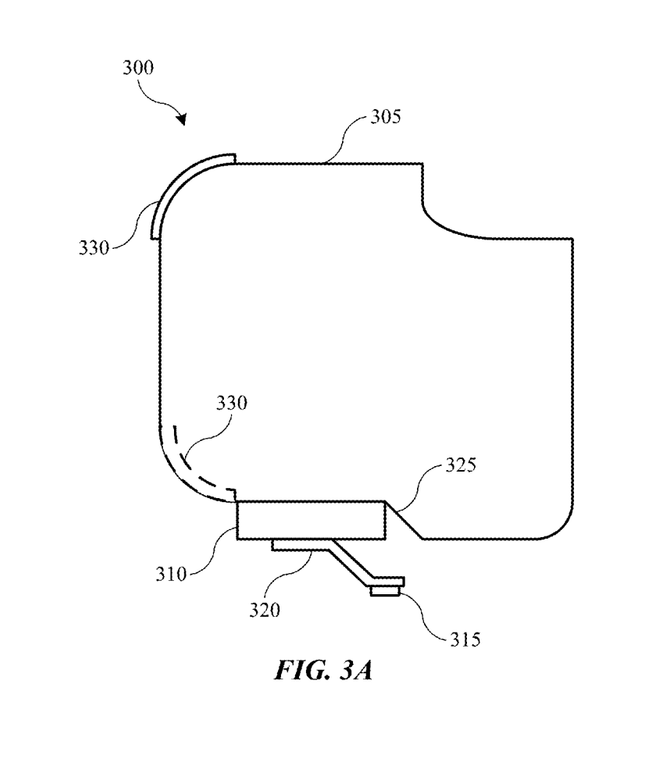
FIGS. 3A-3B show a schematic views of a battery systems encompassed by some embodiments of the present technology.

FIG. 3A shows a schematic cross-sectional view of a battery system 300 according to embodiments of the present technology. Battery system 300 may include any of the components previously described, and may include a battery 305, and a module 310. Battery 305 may include a battery cell as previously described in FIG. 1, and may include one or more cells included within a pouch or packaging. For example, in some embodiments battery 305 may include a rigid housing, and may include a conductive housing. The conductive housing may be maintained at positive or negative potential in embodiments, and may be maintained at negative potential, which may then operate as a device ground, and be considered similar to a neutral connection. Additionally, by using a rigid housing instead of a flexible pouch, fabrication tolerances on the battery dimensions may be reduced, which may afford increased volume for the internal battery cells, which may provide increased capacity over conventional designs. The rigid housing or can may include a multiple-part assembly, which may be a lid enclosure coupled with the rest of the housing, and which may be or include a seamless or substantially seamless form providing an internal volume in which the battery cell or cells and electrolyte may be contained.

Module 310 may monitor and manage aspects of battery operation, and may be a power control module in embodiments. Module 310 may electrically couple with electrode terminals of the battery 305, and may transfer power through connector 315, which may be any type of connector, such as a board-to-board connector, for example. In some embodiments, module 310 may not extend beyond the lateral dimensions of battery 305, and may be maintained within a width of the battery 305. The connector 315 may be part of a coupling 320, which may be a flexible coupling extending from the module 310. For example, connector 315 may be at or near a distal end of the coupling 320. Coupling 320 may partially extend beyond a lateral dimension of the battery 305 as illustrated, although coupling 320 may be flexible and when incorporated within a device, may be moveable within a particular volume. Module 310, however, may be fully contained within the lateral width of the battery 305 in some embodiments.

Battery 305 may include a housing in which the battery cell material may be included. As device shapes and sizes continue to become not only more restrictive, but more complex geometrically, batteries and battery systems that can better accommodate volumes within these devices may provide increased energy density compared to conventional batteries. However, as device systems include more components, and may be exposed to increased shock, such as from dropping or general use, protecting more intricate and possibly delicate components may limit the ability to further reduce device tolerances. The present technology may overcome many of these issues by recessing circuit module components within a volume at least partially defined by the battery, and may reinforce corners of the battery, which may further protect the battery cell. By improving structural resiliency of the housing, and by utilizing aspects of the battery connections, battery cells may be increased within available volumes, which may afford longer device usage between charge or battery replacement.

Figure 3B:
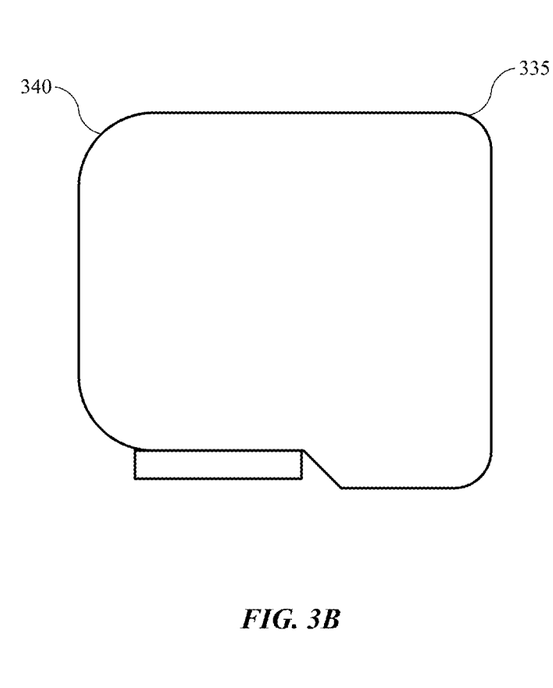

For example, as illustrated, battery cells according to some embodiments of the present technology may be characterized by any number of shapes, including non-rectangular shapes. Although FIGS. 3A and 3B illustrate two possible designs, the present technology may encompass any number of configurations that may include one or more rounded corners. This may protect internal components of a device from contact with sharp corners of a cell, or may better accommodate other system components within the device. Additionally, battery cells according to some embodiments of the present technology may include a portion of the battery cell that is recessed, and within which recess the battery module may be disposed. As shown in FIG. 3A, the battery cell housing may define a recessed portion 325 of the battery cell along a surface of the battery cell, which may be a surface along which electrode terminals may be located as will be described further below. The recessed portion may extend from any location along the surface of the battery, such as between the electrode terminals as will be discussed below, to an edge of the battery as illustrated. In some embodiments, the battery module 310 may be at least partially recessed within the recessed portion of the battery. This may allow improved protection of components on the module, such as circuit elements, and may further limit the footprint of the battery system.

By utilizing rigid enclosures in some embodiments of the present technology, battery systems may be characterized by reduced enclosure thicknesses, while still ensuring structural integrity of the battery cell, such as against expansion over time of the battery cell materials. By utilizing rigid materials, which may be metal, such as stainless steel, for example, housing wall thickness may be less than 1 mm in some embodiments, and may be less than or about 900 µm, less than or about 800 µm, less than or about 700 µm, less than or about 600 µm, less than or about 500 µm, less than or about 400 µm, less than or about 300 µm, less than or about 200 µm, less than or about 100 µm, or less.

Although these reduced thickness housing walls may ensure hermetic sealing of the battery cell and components within the housing, the walls may be more prone to deflection when contacted externally. For example, when included in a device that during use may have internal components to move, the components may contact one another, which could cause denting or deformation of thinner structural walls. Accordingly, in some embodiments of the present technology, batteries may include one or more structural supports 330 extending about corners of the battery housing. As shown, structural supports may be coupled about internal or external corners or surfaces of the battery, which may improve resiliency of the material. The structural supports may be the same or different materials as the housing, and in some embodiments the structural supports may be welded, adhered, bonded, or otherwise coupled with the housing to increase thickness at specific locations, while limiting an impact on reduced internal volume of the battery, or increase footprint of the battery within a device.

As noted above, FIGS. 3A and 3B may illustrate only a couple possible configurations of batteries according to embodiments encompassed by the present technology. For example, batteries according to embodiments of the present technology may include any number of angled or rounded corners, which may extend internally or externally. Batteries may include recessed corners as shown in FIG. 3A, and may include rounded corners characterized by any radius of curvature. For example, as illustrated in FIG. 3B, a battery, or battery housing, may be characterized by one or more rounded corners. The battery may include a first rounded corner 335, which may be characterized by a first radius of curvature or corner radius. The battery may also include a second rounded corner 340, which may be characterized by a second radius of curvature or corner radius, and which may be a greater radius of curvature than the first. Any or all of these corners may be reinforced with structural supports, along with any other edge or side of the batteries. Accordingly, any number of battery configurations may be accommodated by housings and structures according to embodiments of the present technology.

Figure 4:
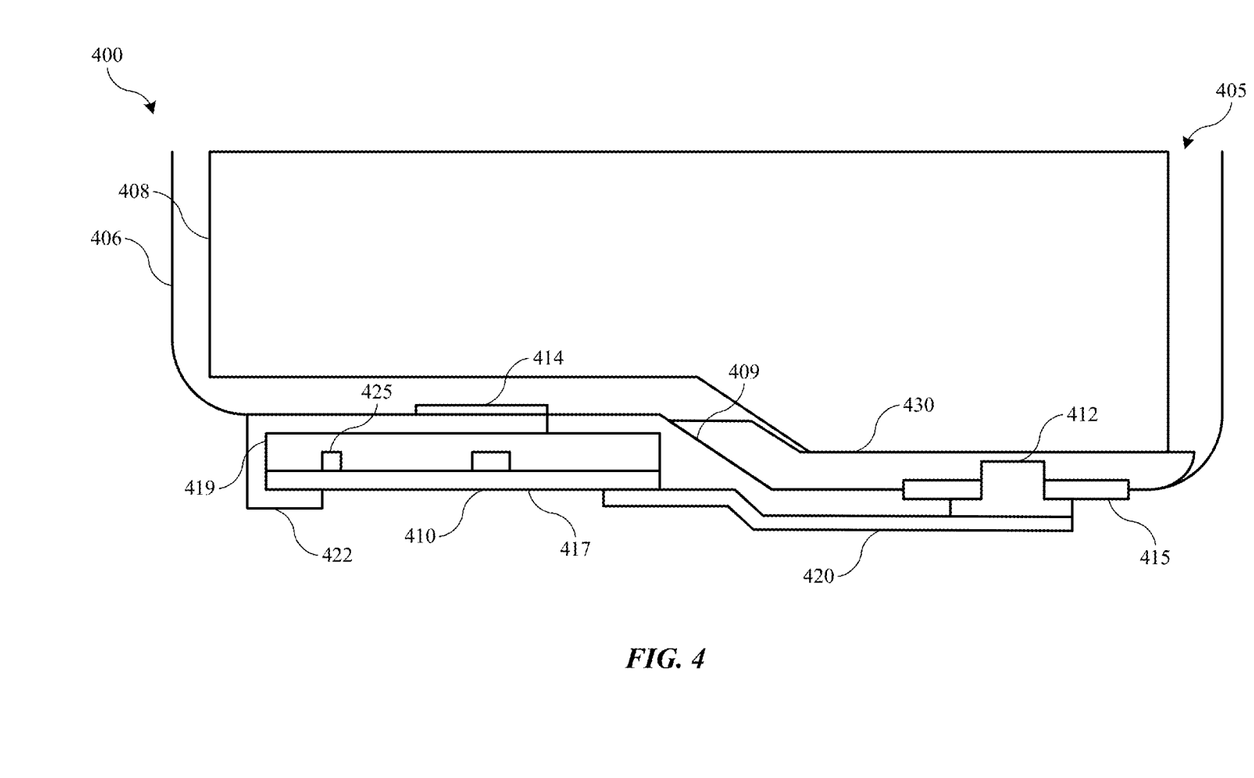
FIG. 4 shows a schematic, cross-sectional, partial top view of a battery system according to some embodiments of the present technology.

FIG. 4 shows a schematic, cross-sectional, partial, top view of a battery system 400 according to some embodiments of the present technology. As shown in FIG. 4, battery system 400 may include some or all of the components, characteristics, or aspects of battery cells or systems described above, although some aspects may be adjusted to illustrate additionally encompassed embodiments of the present technology. For example, battery system 400 in this view shows a battery 405 and module 410. Additional aspects of both the battery 405 and module 410 are shown including multiple locations for electrical and or mechanical coupling of the components. Battery 405 and module 410 may include any of the features or characteristics described above, although some details have been removed for the sake of explanation, such as a flexible coupling for the module. The present technology may utilize any number of module designs, and in some embodiments may include a system-in-package module, which may improve device dimensions over other schemes. For example, a system-in-package module may incorporate multiple integrated circuits on a single carrier substrate or board. This may afford compact device placement and wiring compared to conventional designs. Such a configuration may include components of the module that may be incorporated on a single side of the module to reduce the module footprint.

Battery 405 may include a housing 406 and a battery cell 408, which may be disposed within the housing. One or more terminals may be disposed along a surface of the battery housing, and may provide electrical access to the battery cell. In some embodiments, the electrode terminals may be disposed on the same surface of the battery housing along which a recessed portion is defined. As illustrated, recess 409 may be located partway along the surface of the housing 406, and may be located between the electrode terminals such that the two electrode terminals are located on offset planes as shown. The recess may extend to an edge of the battery housing in some embodiments, which may define a recessed portion as previously described, or recessed volume within the overall outer dimensions of the battery cell. In some embodiments, module 410 may be at least partially seated within the recessed portion. For example, in some embodiments, battery module 410 may be completely laterally disposed within the recessed region, such that the module does not extend beyond a lateral edge of the battery housing, and also does not extend laterally beyond recess 409 as shown, although it is to be understood that a flex coupling may extend differently and in a number of ways to couple with other components. Additionally, in some embodiments the module may be at least partially recessed within the depth or volume of the recess, and may be fully recessed within the volume in some embodiments.

A first electrode terminal 412 and a second electrode terminal 414 may extend from or be accessible along the surface of battery 405, which may be the surface defining recess 409 in some embodiments as illustrated, and may be a first surface of the battery. In some embodiments each of the first electrode terminal and the second electrode terminal may extend from the first surface of battery 405 to the same position. In some embodiments, such as illustrated, first electrode terminal 412 may extend outward from the first surface further than second electrode terminal 414, which may be due to second electrode terminal 414 being disposed along the recessed portion of the battery housing as shown. As previously noted, in some embodiments the housing of battery 405 may be conductive and may be at the potential of one of the electrodes, such as the anode, although the housing may also be maintained at cathode potential. The second electrode terminal 414 may represent the electrode terminal of the potential at which the housing is maintained. Accordingly, the terminal may be a contact, tab, or access of the housing. The first electrode terminal 412, however, may be at the opposite potential of the housing and/or the second electrode terminal 414, and may be maintained or electrically isolated from the rest of the housing. For example, first electrode terminal 412 may be the cathode terminal, although the terminal may also be maintained at anode potential in other embodiments.

To isolate the first electrode terminal 412 from the rest of the housing, a spacer 415 may extend circumferentially about the first electrode terminal through the housing of battery 405, including along the first surface of housing 406. Consequently, first electrode terminal 412 may extend proud of the housing to ensure electrical isolation. In order to limit the extensions of the module to accommodate this configuration, in some embodiments the module 410 may include different conductive tabs as well as a lateral spatial offset of the module to accommodate the spatial offset of the two terminals, especially between the recessed and non-recessed portion of the housing along the surface.

Module 410 may be electrically coupled with battery 405 at both the first electrode terminal and the second electrode terminal. As shown, module 410 may include a circuit board 417 as well as an overmold 419, which may be an encapsulant or protective material. The circuit board 417 may be characterized by a first surface facing the battery and a second surface opposite the first surface. Overmold 419 may extend from the first surface of the circuit board 417 towards the battery 405, such as towards the first surface of the battery defining the recess. Overmold 419 may, similar to the circuit board and overall module 410, extend laterally parallel or substantially parallel with the first surface of battery 405, and may be maintained along with circuit board 417 between first electrode terminal 412 and a lateral edge of the battery, and may be laterally maintained within the recessed portion of the battery, similar to the circuit board. Module 410 may extend across the second electrode terminal 414 in some embodiments. A first contact and a second contact may be included on the second surface of the circuit board to electrically couple the module with the battery 405. Extending between and electrically coupling the first contact with the first electrode terminal 412 may be a first conductive tab 420. Extending between and electrically coupling the second contact with the second electrode terminal 414 may be a second conductive tab 422. These connections will be described in further detail below.

In some embodiments as illustrated, overmold 419 may extend fully across circuit board 417 along the first surface of the circuit board. Circuit board 417 may include one or more electronic devices 425 or components extending from either or both of the first surface or the second surface of the circuit board, although in some embodiments the electronic devices, such as transistors or other circuit components, may all extend from the first surface and be encapsulated by overmold 419. Of course, contacts may extend on the second side of the circuit board for coupling the conductive tabs. By including the electronic devices along the first surface, increased protection may be afforded to limit exposure of the devices to contact from other components in a device.

Returning to the conductive tabs electrically coupling the module 410 with the battery 405, first conductive tab 420 may extend from a first lateral edge of module 410, and from the second surface of circuit board 417. The conductive tab may extend laterally towards first electrode terminal 412, and may be sealed, welded, or otherwise electrically coupled with the first electrode terminal. As illustrated, first electrode terminal 412 may extend outward from or proud of the first surface of battery 405 beyond a plane extending along the second surface of the circuit board. First conductive tab 420 may include an outward bend or jog as illustrated, which may extend the first conductive tab from a first plane in line with the second surface of the circuit board to a second plane parallel with the first, and in line with an exterior or coupling surface of the first electrode terminal 412.

Second conductive tab 422 may extend a greater distance than first conductive tab 420 in some embodiments. Second conductive tab 422 may extend from a second lateral edge of module 410, which may be opposite the first lateral edge from which first conductive tab 420 may extend. Second conductive tab 422 may also extend from the second surface of circuit board 417. Once clearing the external lateral edge of module 410, second conductive tab 422 may bend along module 410 in a direction orthogonal to the first surface of the battery, as well as the first surface and second surface of circuit board 417. Once clearing the overmold 419, the second conductive tab 422 may again bend along module 410 in a direction substantially parallel to the first surface of battery 405, and may extend back across from an initial direction of extension. For example, from a proximal end of conductive tab 422 extending from the circuit board, the tab may extend in a first direction to the exterior edge of module 410 and extending back about 180° along a front surface of the module facing the battery. Second conductive tab 422 may wrap around a lateral edge of the module as illustrated towards the second electrode terminal. A distal end of second conductive tab 422 may then be welded, joined, or otherwise electrically coupled with second electrode terminal 414. As illustrated, second conductive tab 422 may extend between the module 410 or overmold 419 and the first surface of the battery. Multiple adhesives may be included both for component protection and positioning, and in some embodiments adhesives may be disposed over one or both conductive tabs.

The recessed portion of the battery may accommodate internal battery components in some embodiments of the present technology. For example, battery cell 408 may include a notch or recessed portion through the electrode materials as shown, which may accommodate the recessed portion of the battery housing. By utilizing battery cell material that may be characterized by non-rectangular dimensions, an increased internal volume may be accommodated by the battery cell. As illustrated, because the battery cell material may extend outward towards the first electrode terminal, and the module may extend into the recessed portion of the battery, in some embodiments a portion of the battery cell 408 may extend past a plane defined along the recessed portion of the battery housing, and may extend past a plane defined along an innermost surface of the module, such as a surface of overmold 419 of the module.

As discussed above, because the housing 406 may be maintained at an electrode potential, such as the anode potential, for example, the electrode terminal of the opposite potential, such as first electrode terminal 412, may be isolated from the housing. To further protect the coupling between the first electrode terminal and the electrode tabs of the battery cell coupled with the first electrode terminal, an insulation 430 may be disposed within the housing and about the first electrode terminal 412. The insulation 430 may be disposed along the interior of the first surface of the battery housing. In some embodiments, the insulation may be maintained on the non-recessed portion along the first surface of the battery housing, and may not extend into the recessed portion of the battery along the interior side of the first surface of the battery. This may minimize the amount of insulation included, which may provide more internal volume to the battery cell materials.

Battery systems according to embodiments of the present technology may provide a limited footprint extension for a control module associated with a battery. Because many electronic devices have limited volume for a battery, the present technology allows more of this volume to be used for battery cell material, which may increase or maintain battery capacity in smaller devices. Additionally, while many battery configurations are characterized by uneven external topographies, modules according to some embodiments of the present technology may maintain a substantially even external surface by providing internal overmolds and component configurations that accommodate the uneven battery characteristics.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery system comprising:
  a battery including:
    a first electrode terminal accessible in a first plane along a first surface of the battery and a second electrode terminal accessible in a second plane along the first surface of the battery, wherein the first plane is offset from the second plane;
    a housing defining a recessed portion on the first surface of the battery between the first electrode terminal and the second electrode terminal; and
  a module electrically coupled with the battery, the module comprising:
    a circuit board disposed entirely within the recessed portion and including one or more electrical components extending from a first surface of the circuit board towards the battery,
    a first conductive tab extending from a second surface of the circuit board opposite the first surface of the circuit board, wherein the first conductive tab is electrically coupling the module with the first electrode terminal, and
    a second conductive tab extending from the second surface of the circuit board, wherein the second conductive tab is electrically coupling the module with the second electrode terminal.

2. The battery system of claim 1, wherein the recessed portion extends from a position between the first electrode terminal and the second electrode terminal to an edge of the battery.

3. The battery system of claim 2, wherein the second electrode terminal is disposed along the recessed portion of the battery.

4. The battery system of claim 1, wherein the battery further comprises a battery cell, wherein the battery cell is disposed within the housing, and wherein a portion of the battery cell extends past a plane through the housing along the recessed portion of the first surface of the battery.

5. The battery system of claim 1, wherein the first conductive tab extends beyond a first lateral edge of the module, and wherein the second conductive tab extends beyond a second lateral edge of the module opposite the first lateral edge of the module.

6. The battery system of claim 5, wherein the second conductive tab wraps around a lateral edge of the module and wraps across the first surface of the circuit board towards the second electrode terminal.

7. The battery system of claim 5, wherein the first electrode terminal extends beyond the first surface of the battery towards the first surface of the circuit board, and wherein the first conductive tab extends outward from the second surface of the circuit board to couple with the first electrode terminal.

8. The battery system of claim 1, wherein the circuit board extends substantially parallel to the second plane of the first surface of the battery to a location proximate the recess portion along the first surface of the battery.

9. The battery system of claim 1, further comprising:
a structural support coupled about a corner of the battery.

10. The battery system of claim 1, further comprising:
insulation disposed within the battery along an interior side of the first surface of the battery, wherein the insulation is disposed about the first electrode terminal and does not extend into the recessed portion of the battery along the interior side of the first surface of the battery.

11. A battery system comprising:
a battery including:
a housing;
a battery cell disposed within the housing;
a first electrode terminal accessible in a first plane along a first surface of the housing and a second electrode terminal accessible in a second plane along the first surface of the housing, wherein:
the first plane is offset from the second plane;
the housing defines a recessed portion on the first surface of the battery between the first electrode terminal and the second electrode terminal; and
the recessed portion of the battery extends from a position between the first electrode terminal and the second electrode terminal to an edge of the housing; and
a module electrically coupled with the battery, the module comprising:
a circuit board disposed entirely within the recessed portion,
a first conductive tab extending from a second surface of the circuit board opposite a first surface of the circuit board facing the battery, wherein the first conductive tab is electrically coupling the module with the first electrode terminal, and
a second conductive tab extending from the second surface of the circuit board, wherein the second conductive tab is electrically coupling the module with the second electrode terminal.

12. The battery system of claim 11, wherein the second electrode terminal is disposed along the recessed portion of the battery.

13. The battery system of claim 11, wherein the housing of the battery defines at least two rounded corners, and wherein a first rounded corner of the at least two rounded corners is characterized by a first corner radius, and wherein a second rounded corner of the at least two rounded corners is characterized by a second corner radius greater than the first corner radius.

14. The battery system of claim 11, wherein the first conductive tab extends beyond a first lateral edge of the module, wherein the second conductive tab wraps around a second lateral edge of the module opposite the first lateral edge of the module.

15. A battery system comprising:
a battery including:
a first electrode terminal accessible in a first plane along a first surface of the battery and a second electrode terminal accessible in a second plane along the first surface of the battery, wherein the first plane is offset from the second plane;
a housing defining a recessed portion on the first surface of the battery between the first electrode terminal and the second electrode terminal, wherein the recessed portion extends from a position between the first electrode terminal and the second electrode terminal to an edge of the battery; and
a module electrically coupled with the battery, the module comprising:
a circuit board disposed entirely within the recessed portion,
a first conductive tab extending from a second surface of the circuit board opposite a first surface of the circuit board facing the battery, wherein the first conductive tab is electrically coupling the module with the first electrode terminal, and
a second conductive tab extending from the second surface of the circuit board, wherein the second conductive tab is electrically coupling the module with the second electrode terminal.

16. The battery system of claim 1, wherein the first electrode terminal is disposed in the recessed portion and the second electrode terminal is disposed outside of the recessed portion.

17. The battery system of claim 1, wherein the first conductive tab is electrically coupling the module with the first electrode terminal in the first plane, and wherein the second conductive tab is electrically coupling the module with the second electrode terminal in the second plane.

18. The battery system of claim 1, wherein the recessed portion defines a recessed volume, and wherein, besides the first conductive tab, the module is fully recessed within the recessed volume.

19. The battery system of claim 1, wherein the first plane is connected to the second plane via a sloped portion of the first surface extending between the first plane and the second plane.

20. The battery system of claim 1, further comprising an overmold extending from the first surface of the circuit board toward the battery, wherein the overmold encapsulates the one or more electrical components.

* * * * *